United States Patent
Ammouri et al.

(10) Patent No.: US 8,765,018 B2
(45) Date of Patent: Jul. 1, 2014

(54) METHOD FOR CONTROLLING A REFORMING REACTION BY MEASUREMENT OF THE TEMPERATURE OF THE REFORMING TUBES AND FUNCTIONAL PARAMETER MODIFICATION

(75) Inventors: Fouad Ammouri, Massy (FR); Jean Gallarda, Joinville le Point (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 1426 days.

(21) Appl. No.: 12/516,734

(22) PCT Filed: Oct. 29, 2007

(86) PCT No.: PCT/FR2007/052266
§ 371 (c)(1),
(2), (4) Date: Jan. 20, 2010

(87) PCT Pub. No.: WO2008/068434
PCT Pub. Date: Jun. 12, 2008

(65) Prior Publication Data
US 2010/0140552 A1 Jun. 10, 2010

(30) Foreign Application Priority Data
Dec. 5, 2006 (FR) .................................. 06 55308

(51) Int. Cl.
*C01B 3/26* (2006.01)
(52) U.S. Cl.
USPC ............................. 252/373; 423/652; 423/653
(58) Field of Classification Search
USPC .................. 422/650, 625; 122/275; 48/198.7; 252/373; 431/174; 423/652, 653
See application file for complete search history.

(56) References Cited

U.S. PATENT DOCUMENTS

| 3,656,913 A | 4/1972 | Blaha et al. |
| 7,288,691 B2 | 10/2007 | Martin et al. |

FOREIGN PATENT DOCUMENTS

| EP | 1094031 | 4/2001 |
| EP | 1136444 | 9/2001 |
| EP | 1216955 | 6/2002 |
| EP | 1216955 A2 * | 6/2002 |
| FR | 2850392 | 7/2004 |
| GB | 1247338 | 9/1971 |

OTHER PUBLICATIONS

Written Opinion of PCT/FR2007/052266.
PCT/FR2007/052266 Search Report.

* cited by examiner

*Primary Examiner* — Wayne Langel
*Assistant Examiner* — Syed Iqbal
(74) *Attorney, Agent, or Firm* — Justin K. Murray

(57) ABSTRACT

The invention relates to a method for controlling a hydrocarbon vapor reforming reaction using a combustion chamber containing burners and tubes, said tubes being filled with catalysts and capable of being crossed by a mixture of hydrocarbons and vapor, the burners being arranged so as to transfer their combustion heat to the mixture of hydrocarbons and vapor through the walls of the tubes, wherein the temperature T of the wall of each tube is measured in the downstream part of the tube, and if for at least one tube, the measured temperature "is higher or equal to the MOT (DTT-15° C.), DTT being the design temperature of the measured tube, the functional parameters of the reforming method are then modified so as to decrease the measured temperature T of this tube down to a value lower than the MOT.

18 Claims, 1 Drawing Sheet

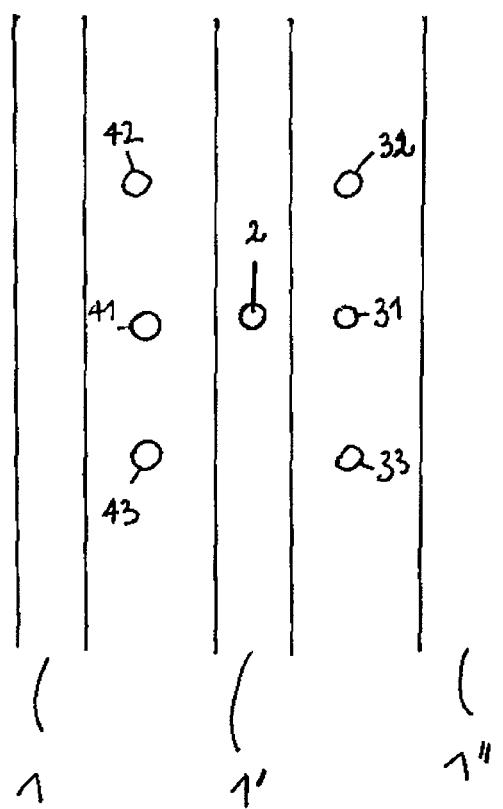

METHOD FOR CONTROLLING A REFORMING REACTION BY MEASUREMENT OF THE TEMPERATURE OF THE REFORMING TUBES AND FUNCTIONAL PARAMETER MODIFICATION

This application is a §371 of International PCT Application PCT/FR2007/052266, filed Oct. 29, 2007.

FIELD OF THE INVENTION

The present invention relates to a method for controlling a hydrocarbon steam reforming process for obtaining a syngas.

BACKGROUND

A hydrocarbon steam reforming process is carried out in a combustion chamber of a reforming furnace comprising burners and tubes filled with catalysts that are capable of being passed through by a mixture of hydrocarbons and steam. The burners are positioned so as to transfer the heat from their combustion to the mixture of hydrocarbons and steam through the wall of the tubes, generally by radiation of the heat from the flame to the refractory walls of the combustion chamber.

The reformer tubes usually have a service life of around 100 000 hours under normal operating conditions.

Temperatures that are higher than anticipated reduce the service life of the tubes: thus, the service life may be halved if the tube is used at a temperature of 10 to 20° C. above its design temperature or DTT (design temperature of the tube).

However, high temperatures are still desirable for increasing the syngas production yield.

Consequently, it is necessary to control the method used in the furnace so as to use a high temperature that allows a high yield of syngas while making sure that this temperature does not reduce the service life of the reforming tubes. The temperature DTT−15° C. is considered to be the maximum temperature at which the reforming furnace can be used without risk, this maximum operating temperature is also referred to as MOT.

The objective of the present invention is to provide such a method of control.

SUMMARY OF THE INVENTION

For this purpose the invention relates to a method for controlling a hydrocarbon steam reforming process carried out in a combustion chamber comprising burners and tubes, said tubes being filled with catalyst and being capable of being passed through by a mixture of hydrocarbons and steam, the burners being positioned so as to transfer the heat from their combustion to the mixture of hydrocarbons and steam through the wall of the tubes, the method according to which the wall temperature T of each tube is measured, preferably in the downstream part of the tube, and if, for at least one tube, the temperature measured T is greater than or equal to the MOT, then at least one operating parameter of the reforming is modified so as to lower the measured temperature T of this tube to a value below the MOT.

BRIEF DESCRIPTION OF THE FIGURES

FIG. 1 illustrates three reforming tubes.

DETAILED DESCRIPTION OF THE INVENTION

The invention therefore comprises a step of measuring the temperature T of the wall of each tube in the downstream part of said tube. The expression "downstream part" is understood to mean the half of the tube located downstream according to the direction of flow of the mixture of hydrocarbons and steam in the tube. Each tube has a design temperature DTT specific to the nature of its metallic composition and its geometry. This temperature is defined by the tube manufacturer. According to the invention, the temperature T for each tube is measured and it is compared to the design temperature DTT of this tube. If the temperature measured T is below the MOT, no action for controlling the reforming reaction is necessary. On the other hand, if for at least one tube, the temperature T measured for this tube is greater than or equal to the MOT, then, in a second step, operating parameters of the reforming reaction are modified so as to lower the reforming temperature, and therefore the measured temperature T of this tube, to a value below the MOT.

According to the method of the invention, the steps of measuring the wall temperature T of each tube and of optionally modifying at least one operating parameter are carried out at least once a month.

Preferably, this measurement is also carried out during the start-ups of the reforming installation and during the production tests.

In order to ensure the safety of the tubes between two measurements of the temperature T of all of the tubes as described above, the invention may also comprise all or some of the following operations:

during each measurement of the temperature T for all of the tubes, the tubes that are said to be "very hot" (very hot tube) are identified, these are tubes for which the temperature measured T is greater than or equal to MOT−10° C. If, for at least one of the tubes, the temperature measured T is greater than or equal to MOT−10° C., then the temperature of this at least one identified tube is measured more frequently and preferably every day. It is clear that the limiting temperature MOT−10° C. used for carrying out this increased monitoring may be adapted by a person skilled in the art who would have to take into account particular conditions;

during each measurement of the temperature T for all of the tubes, the hottest 25% of the tubes are identified, even if these tubes are not "very hot" tubes according to the invention, so that, in the case of a modification of the operating parameters of the reforming process that results in a significant increase in the temperature of the tubes, the temperature of these hottest 25% of the tubes is measured. If, for at least one tube the temperature measured T is greater than or equal to MOT−10° C., the temperature of this at least one tube, then identified as a "very hot tube", is measured more frequently and preferably every day.

Among the factors which may lead to a significant increase in the temperature of the tubes, mention may be made, for example, of a 5 to 10% increase in the charge supplying the reforming furnace, the 5 to 10° C. increase in the outlet temperature of the syngas generated in the tubes, the stopping of the recycling of the $CO_2$ or the modification of the configuration of the burners.

In order to lower the temperature of the tubes, preferably at least one operating parameter is modified, this operating parameter being chosen from: the flow rate of the mixture of hydrocarbons and steam, the ratio between the amounts of hydrocarbons and steam, the flow rates of oxidant and/or of fuel in the burners, the pressure of the oxidant and/or of the fuel in the burners, and the percentage of oxygen in the oxidant; it will advantageously be chosen to modify the flow rates of fuel and/or of oxidant of the burners.

Preferably, the wall temperature T of the tubes is measured using a pyrometer. It is also possible to use a contact thermocouple or an infrared camera. The pyrometric measurements are carried out through openings made in the wall of the furnace, "peepholes" through which an operator points a pyrometer (or another measuring instrument) at the tube for which the wall temperature T must be measured. The pyrometer is held horizontally during the measurement. For a pyrometer, according to a first variant, it is possible to take, as the wall temperature T of the tube, the value Tm indicated by the pyrometer when it is aimed directly at the wall of the tube. According to a second variant, for a pyrometer, the wall temperature T of the tube is deduced on the one hand, from the value Tm indicated by the pyrometer pointed through a peephole located in a wall of the combustion chamber (first wall) and aimed directly at the tube and, on the other hand, from the average temperature Tw of this same wall, in the vicinity of the tube, from the formula:

$$T(\text{Kelvin}) = 14388 \bigg/ \left( \lambda \ln \left[ 1 + \frac{\varepsilon}{\frac{1}{e^{14388/\lambda Tm} - 1} - \frac{(1-\varepsilon)}{e^{14388/\lambda Tw} - 1}} \right] \right)$$

in which:
T is the temperature in Kelvin;
$\lambda$ is the wavelength of the pyrometer in $\mu m$;
Tm is the temperature indicated by the pyrometer when it is aimed directly at the tube, in Kelvin;
Tw, in Kelvin, is the average of six temperature measurements taken from the (first) wall of the combustion chamber on both sides of the tube; and
$\varepsilon$ is the emissivity of the tube.

According to the second variant, it is therefore necessary to carry out, using the pyrometer, six temperature measurements on the wall of the combustion chamber from which the measurement Tm of the temperature of the tube was taken (namely the first wall). These six measurements are carried out by pointing the pyrometer from the second wall of the chamber to the first wall of the combustion chamber:

three measurements were carried out to the right of the tube:
a first measurement at the height of the point of the tube where the measurement Tm was taken;
the second measurement above and in a vertical line with the first measurement; and
the third measurement below and in a vertical line with the first measurement;
three measurements were carried out to the left of the tube:
a first measurement at the height of the point of the tube where the measurement Tm was taken;
the second measurement above and in a vertical line with the first measurement; and
the third measurement below and in a vertical line with the first measurement.

In order to illustrate the location of these six measurements, FIG. 1 represents 3 reforming tubes 1, 1' and 1". The temperature Tm is measured at the point 2 located on the tube 1' by pointing the pyrometer directly at this tube. In order to obtain Tw, six measurements were carried out on the wall of the combustion chamber (located behind the tube 1' during the measurement of the temperature of the wall of the chamber): 3 to the right of tube 1' (31, 32, and 33) and 3 to the left of the tube (41, 42 and 43).

The emissivity $\varepsilon$ of the tube may be provided by the tube manufacturer or measured in the laboratory on a sample of the tube.

The measurements according to the second variant are particularly useful for measuring the wall temperature of the tubes located diagonally relative to the openings made in the wall of the furnace (peepholes) since, not being opposite the openings, these tubes do not undergo the cooling phenomenon due to the opening of the peephole.

This type of measurement is also preferred for the tubes said to be "very hot", that is to say all the tubes that have already exhibited a wall temperature T greater than or equal to MOT–10° C., and also for all the tubes which are part of the 25% of tubes having the hottest temperatures.

This measurement method can be applied to any type of reforming furnace.

The present invention has the advantage of limiting the ageing of the reforming tubes. Another advantage is that it makes it possible to better control the power in the various burners and to ensure an optimal production of syngas from the reforming reaction.

What is claimed is:

1. A method for controlling a hydrocarbon steam reforming process carried out in a combustion chamber comprising burners and tubes, the tubes being filled with catalyst and being capable of being passed through by a mixture of hydrocarbons and steam, the burners being positioned so as to transfer the heat from their combustion to the mixture of hydrocarbons and steam through the wall of the tubes, the method comprising the steps of:
measuring a wall temperature T of each tube; and
modifying at least one operating parameter of the reforming process when, for at least one tube, the measured wall temperature T is greater than or equal to a maximum operating temperature of the tubes, so as to lower the wall temperature T of said tube to a value below the maximum operating temperature of the tubes
wherein the wall temperature T of the tube is deduced from a value Tm indicated by a pyrometer when it is aimed directly at the tube and from an average temperature Tw of a wall of the combustion chamber in the vicinity of the tube from the formula:

$$T(\text{Kelvin}) = 14388 \bigg/ \left( \lambda \ln \left[ 1 + \frac{\varepsilon}{\frac{1}{e^{14388/\lambda Tm} - 1} - \frac{(1-\varepsilon)}{e^{14388/\lambda Tw} - 1}} \right] \right)$$

in which:
T is the wall temperature in Kelvin;
$\lambda$ is the wavelength of the pyrometer in $\mu m$;
Tm is the temperature indicated by the pyrometer when it is aimed directly at the tube, in Kelvin;
Tw, in Kelvin, is the average of a plurality of temperature measurements taken from the wall of the combustion chamber on both sides of the tube; and
$\varepsilon$ is the emissivity of the tube.

2. The method of claim 1, wherein the step of measuring the wall temperature T of each tube is carried out at least once a month.

3. The method of claim 1, wherein after having measured the wall temperature T of each tube, the tubes for which the measured wall temperature T is greater than or equal to the maximum operating temperature of the tubes –10° C. are identified and measured more frequently than the non-identified tubes.

4. The method of claim 3, wherein the wall temperature T of the identified tube is measured every day.

5. The method of claim 1, wherein after having measured the wall temperature T of each tube, the hottest 25% of the tubes are identified so that, in the case of a modification of the operating parameters of the reforming process that results in a significant increase in the temperature of the tubes, the temperature of these hottest 25% of the tubes is measured, and if, for at least one tube the temperature measured T is greater than or equal to the maximum operating temperature of the tubes −10° C., the temperature of this at least one tube is measured more frequently.

6. The method of claim 5, wherein the wall temperature T of the identified tube is measured every day.

7. The method of claim 1, wherein the at least one operating parameter is selected from the group consisting of: the flow rate of the mixture of hydrocarbons and steam, the ratio between the amounts of hydrocarbons and steam, the flow rates of oxidant and/or of fuel in the burners, the pressure of the oxidant and/or of the fuel in the burners, the percentage of oxygen in the oxidant, and combinations thereof.

8. The method of claim 7, wherein the flow rates of fuel and/or of oxidant of the burners are modified.

9. The method of claim 1, wherein the wall temperature T of the tube is a value Tri indicated by a pyrometer when it is aimed directly at the wall of the tube.

10. The method of claim 1, wherein the plurality of temperature measurements taken from the wall of the combustion chamber on both sides of the tube are carried out by pointing the pyrometer at the wall located behind the tube:
   three measurements were carried out to the right of the tube:
      a first measurement at the height of the point of the tube where the measurement Tm was taken;
      the second measurement above and in a vertical line with the first measurement; and
      the third measurement below and in a vertical line with the first measurement;
   three measurements were carried out to the left of the tube:
      a first measurement at the height of the point of the tube Where the measurement Tm was taken;
      the second measurement above and in a vertical line with the first measurement; and
      the third measurement below and in a vertical line with the first measurement.

11. The method of claim 2, wherein after having measured the wall temperature T of each tube, the tubes for which the measured wall temperature T is greater than or equal to maximum operating temperature of the tubes −10° C. are identified and measured more frequently.

12. The method of claim 11, wherein after having measured the wall temperature T of each tube, the hottest 25% of the tubes are identified so that, in the case of a modification of the operating parameters of the reforming process that results in a significant increase in the temperature of the tubes, the wall temperature T of these hottest 25% of the tubes is measured, and if, for at least one tube the temperature measured T is greater than or equal to the maximum operating temperature of the tubes −10° C., the temperature of this at least one tube is measured more frequently.

13. The method of claim 12, wherein the least one operating parameter is selected from the group consisting of: the flow rate of the mixture of hydrocarbons and steam, the ratio between the amounts of hydrocarbons and steam, the flow rates of oxidant and/or of fuel in the burners, the pressure of the oxidant and/or of the fuel in the burners, the percentage of oxygen in the oxidant, and combinations thereof.

14. The method of claim 2, wherein the wall temperature T of the tube is a value Tm indicated by a pyrometer when it is aimed directly at the wall of the tube.

15. The method of claim 13, wherein the wall temperature T of the tube is a value Tm indicated by a pyrometer when it is aimed directly at the wall of the tube.

16. The method of claim 13, wherein, the plurality of temperature measurements taken from the wall of the combustion chamber on both sides of the tube are carried out by pointing the pyrometer at the wall located behind the tube:
   three measurements were carried out to the right of the tube:
      a first measurement at the height of the point of the tube where the measurement Tm was taken;
      the second measurement above and in a vertical line with the first measurement; and
      the third measurement below and in a vertical line with the first measurement;
   three measurements were carried out to the left of the tube:
      a first measurement at the height of the point of the tube where the measurement Tm was taken;
      the second measurement above and in a vertical line with the first measurement; and
      the third measurement below and in a vertical line with the first measurement.

17. The method of claim 1, wherein the plurality of temperature measurements taken from the wall of the combustion chamber on both sides of the tube are carried out by pointing the pyrometer at the wall located behind the tithe:
   three measurements were carried out to the right of the tube:
      a first measurement at the height of the point of the tube where the measurement Tm was taken;
      the second measurement above and in a vertical line with the first measurement; and
      the third measurement below and in a vertical line with the first measurement;
   three measurements were carried out to the left of the tube:
      a first measurement at the height of the point of the tube where the measurement Tm was taken;
      the second measurement above and in a vertical line with the first measurement; and
      the third measurement below and in a vertical line with the first measurement.

18. The method of claim 1, wherein the value below the maximum operating temperature of the tubes is equal to 15° C. lower than the design temperature of the tube.

* * * * *